US012577006B2

(12) United States Patent
Jansen et al.

(10) Patent No.: US 12,577,006 B2
(45) Date of Patent: Mar. 17, 2026

(54) EGG CONVEYOR ASSEMBLY

(71) Applicant: SANOVO TECHNOLOGY NETHERLANDS B.V., Aalten (NL)

(72) Inventors: Yannik Vince Jansen, Doetinchem (NL); Johannis Cornelis Arie De Korte, Renkum (NL); Jan Hordijk, Aalten (NL)

(73) Assignee: SANOVO TECHNOLOGY NETHERLANDS B.V., Aalten (NL)

( * ) Notice: Subject to any disclaimer, the term of this patent is extended or adjusted under 35 U.S.C. 154(b) by 983 days.

(21) Appl. No.: 17/773,856

(22) PCT Filed: Nov. 6, 2020

(86) PCT No.: PCT/EP2020/081327
§ 371 (c)(1),
(2) Date: May 3, 2022

(87) PCT Pub. No.: WO2021/089805
PCT Pub. Date: May 14, 2021

(65) Prior Publication Data
US 2022/0388700 A1 Dec. 8, 2022

(30) Foreign Application Priority Data
Nov. 7, 2019 (NL) ...................................... 2024179

(51) Int. Cl.
| | |
|---|---|
| *B65B 23/08* | (2006.01) |
| *A01K 43/04* | (2006.01) |
| *B65G 17/00* | (2006.01) |

(52) U.S. Cl.
CPC .............. *B65B 23/08* (2013.01); *A01K 43/04* (2013.01); *B65G 17/007* (2013.01); *B65G 2201/0208* (2013.01)

(58) Field of Classification Search
CPC ................... B65B 23/08; B65B 17/007; B65B 2201/0208; A01K 43/04
(Continued)

(56) References Cited

U.S. PATENT DOCUMENTS

| | | | |
|---|---|---|---|
| 3,370,691 A | 2/1968 | Mosterd | |
| 3,809,265 A * | 5/1974 | Krenke | ................ B65G 17/007 |
| | | | 137/454.2 |

(Continued)

FOREIGN PATENT DOCUMENTS

| | | |
|---|---|---|
| CN | 102271497 A | 12/2011 |
| CN | 106687227 A | 5/2017 |

(Continued)

OTHER PUBLICATIONS

Search Report Priority Application and Written Opinion for Netherland Application No. 2024179, mailed Jun. 25, 2020 (16 pages).

(Continued)

*Primary Examiner* — Paul T Chin
(74) *Attorney, Agent, or Firm* — NIXON PEABODY LLP; Jeffrey L. Costellia

(57) ABSTRACT

An egg conveyor assembly (1) comprises a first conveyor (4) having a first conveyor direction (X), a second conveyor (5) extending in a second conveyor direction (Y) transverse to the first conveyor direction (X) and a transfer device (6) arranged between the first conveyor and the second conveyor. The transfer device includes a transfer conveyor comprising and endless element (60) and extending in the second conveyor direction (Y). The second conveyor circulates second egg retainers (52) continuously, and the transfer conveyor circulates egg transfer retainers (62) discontinuously, in such that the egg transfer retainers of the transfer device are approximately standing still when receiving eggs from the first conveyor, and such that the egg transfer
(Continued)

retainers of the transfer device are moving approximately synchronously with second egg retainers of the second conveyor when dropping the eggs in the second egg retainers of the second conveyor.

20 Claims, 10 Drawing Sheets

(58) Field of Classification Search
USPC ..................................................... 294/87.12
See application file for complete search history.

(56) References Cited

U.S. PATENT DOCUMENTS

| | | | | |
|---|---|---|---|---|
| 4,462,201 | A | * | 7/1984 | Nambu ................. B65G 47/842 |
| | | | | 198/470.1 |
| 4,690,269 | A | | 9/1987 | Takao |
| 4,863,008 | A | | 9/1989 | Doi |
| 5,101,954 | A | | 4/1992 | Nambu |
| 5,232,080 | A | | 8/1993 | Van Essen et al. |
| 6,446,784 | B1 | * | 9/2002 | Veldhuizen ............. B65B 23/08 |
| | | | | 198/395 |
| 2018/0222681 | A1 | * | 8/2018 | Elferink .................. B65B 23/06 |
| 2018/0265307 | A1 | * | 9/2018 | Hordijk .................. B65G 47/38 |
| 2018/0305051 | A1 | * | 10/2018 | Van Den Brink ... B65G 47/847 |
| 2020/0102106 | A1 | * | 4/2020 | Hordijk .................. B65B 23/06 |

FOREIGN PATENT DOCUMENTS

| | | | |
|---|---|---|---|
| CN | 107406155 | A | 11/2017 |
| CN | 107438364 | A | 12/2017 |
| CN | 107637544 | A | 1/2018 |
| CN | 208882942 | | 5/2019 |
| CN | 208882942 | U | 5/2019 |
| EP | 0390241 | | 10/1990 |
| JP | S61-178315 | | 8/1986 |
| JP | S63-262334 | | 10/1988 |
| JP | 2009-143634 | A | 7/2009 |
| NL | 1032805 | | 5/2008 |
| WO | WO-1999/08946 | | 2/1999 |
| WO | 2016/118003 | A1 | 7/2016 |
| WO | WO-2016/118003 | | 7/2016 |

OTHER PUBLICATIONS

Written Opinion for Application No. PCT/EP2020/081327, mailed Apr. 16, 2021 (21 pages).
International Search Report for Application No. PCT/EP2020/081327, mailed Apr. 16, 2021 (9 pages).
Chinese Office Action for App. No. 202080074874.5, mailed Dec. 26, 2023 (9 pages).
Japanese Office Action (Application No. 2022-526451), mailed Aug. 13, 2024.

* cited by examiner

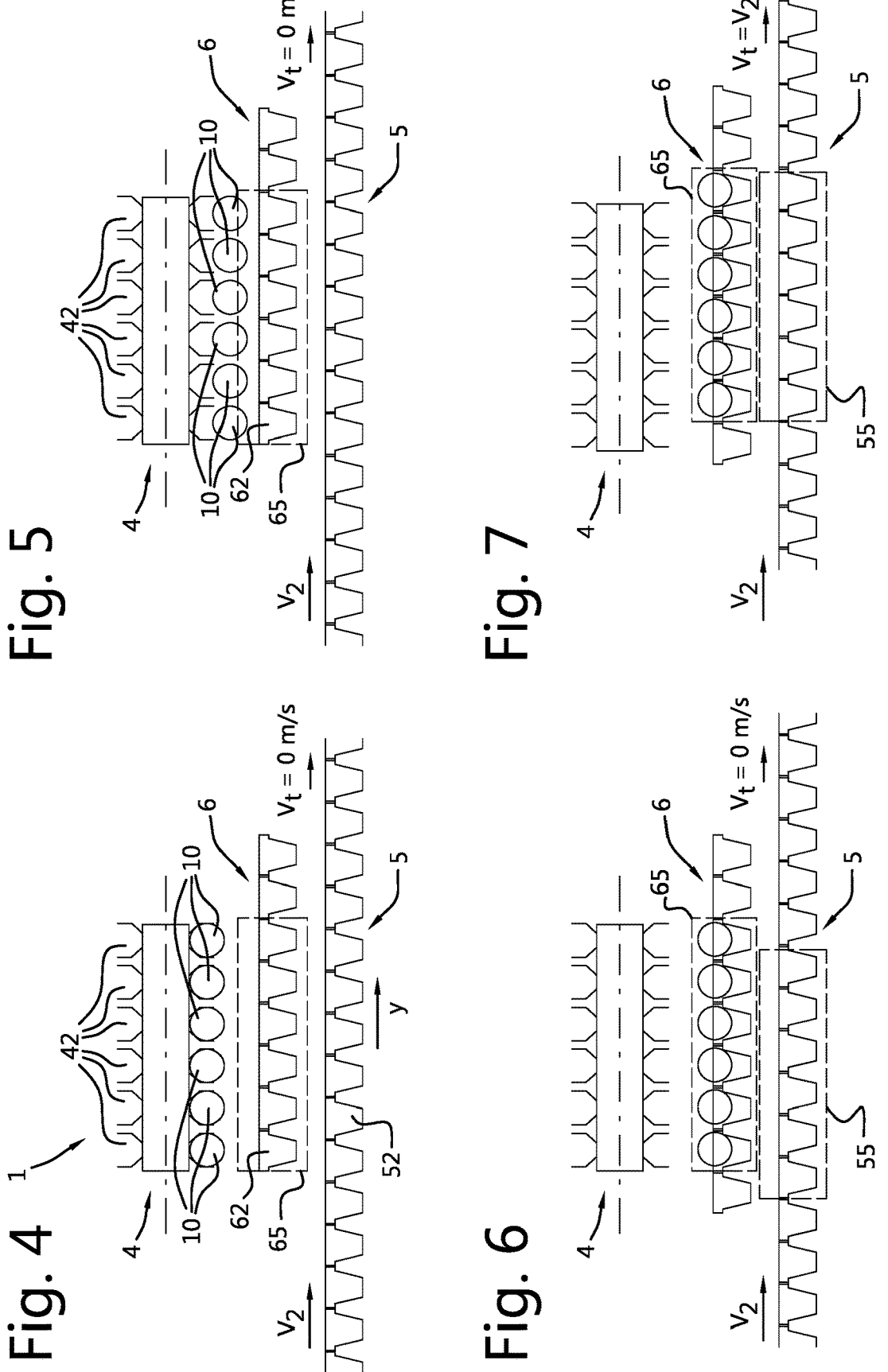

EGG CONVEYOR ASSEMBLY

BACKGROUND OF THE INVENTION

The invention relates to an egg conveyor assembly comprising: a first conveyor comprising and endless element and a plurality of lanes of first egg retainers connected to the endless element and extending in a first conveyor direction (X), a second conveyor arranged on a lower height level than the first conveyor and comprising an endless element and at least one lane of second egg retainers connected to the endless element and extending in a second conveyor direction (Y) transverse, preferably perpendicular, to the first conveyor direction (X), a transfer device arranged on a height level between the first conveyor and the second conveyor and adapted to transfer eggs from the first conveyor to the second conveyor and comprising egg transfer retainers adapted to receive the eggs from above from the first conveyor, and adapted to release the eggs in the second egg retainers of the second conveyor.

WO 2016/118004 discloses an egg conveyor assembly wherein the transfer device is adapted and arranged in such a way that the transfer device in a first stage of movement, in which the eggs are received from the first conveyor, moves in the first conveyor direction (X) with a velocity ($v_x$) synchronised with the first conveyor, and in a second stage of movement, in which the eggs are released to the second conveyor, moves in the second conveyor direction (Y) with a velocity ($v_y$) synchronised with the second conveyor. After the eggs have been released to the second conveyor the transfer device decelerates and returns to the initial position underneath the first conveyor to receive a new batch of eggs.

A disadvantage of the known conveyor assembly is that the return stage of the transfer device costs valuable time. The time loss can be minimized by increasing the speeds at which the transfer device operates. However, high speeds and accelerations which increases noise and wear of components.

The invention has for an object to provide an egg conveyor assembly wherein the above disadvantage is overcome.

This object is achieved by a conveyor assembly according to the invention.

SUMMARY OF THE INVENTION

A conveyor assembly comprising: a first conveyor comprising and endless element and a plurality of lanes of first egg retainers connected to the endless element and extending in a first conveyor direction (X), a second conveyor arranged on a lower height level than the first conveyor and comprising an endless element and at least one lane of second egg retainers connected to the endless element and extending in a second conveyor direction (Y) transverse to the first conveyor direction (X), and a transfer device arranged on a height level between the first conveyor and the second conveyor and adapted to transfer eggs from the first conveyor to the second conveyor and comprising egg transfer retainers adapted to receive the eggs from above from the first conveyor, and adapted to release the eggs in the second egg retainers of the second conveyor. The transfer device includes a transfer conveyor comprising and endless element and at least one lane of said egg transfer retainers connected to the endless element and extending in the second conveyor direction (Y). In use, the second conveyor circulates said at least one lane of second egg retainers continuously, and the transfer conveyor circulates said at least one lane of egg transfer retainers discontinuously, in such a way that the lane of egg transfer retainers of the transfer device is approximately standing still when receiving eggs from the first conveyor, and such that the lane of egg transfer retainers of the transfer device is moving approximately synchronously with the lane of second egg retainers of the second conveyor when dropping the eggs in the second egg retainers of the second conveyor, and wherein the second conveyor and the transfer device are arranged such that they have at least one section where circulating lanes of the second conveyor and the transfer conveyor run in parallel and one above the other, in which section the transfer device releases the eggs in the second egg retainers of the second conveyor.

The invention thus provides two conveyors which extend and move in transverse, preferably perpendicular directions. The first conveyor is relatively wide and has a plurality of lanes, for example six lanes, which form transverse rows of first egg retainers, and is adapted to simultaneously drop eggs from one row in the egg transfer retainers of the transfer device. The first conveyor moves discontinuously or continuously at a relatively low speed. The second conveyor is relatively narrow and moves at a relatively high speed transversely to the first conveyor. If for example the first conveyor has six lanes, the second conveyor may have one or possibly two lanes. If for example the first conveyor has twelve lanes, the second conveyor may have for example three or four lanes. The eggs are transferred from the relatively slow wider first conveyor to the relatively fast narrower conveyor. Since the transfer device according to the invention is embodied as an endless conveyor which moves only in the same direction (Y) as the second conveyor, the return movement is eliminated. The transfer conveyor has a section which runs above a corresponding section of the second conveyor. A number of egg transfer retainers of this transfer conveyor are filled with eggs by the egg retainers of the first conveyor, wherein the number is dependent on the number of lanes of the first conveyor. Next, the transfer conveyor is accelerated until it moves simultaneously or almost simultaneously and in register with the egg retainers of the second conveyor. Next, the eggs can be dropped from egg retainers of the transfer conveyor in the egg retainers of the second conveyor. After the eggs are dropped from the transfer conveyor, the transfer conveyor can immediately be stopped such that new eggs can be received from the first conveyor. No return movement in the Y-direction is necessary, because the transfer device comprises an endless conveyor.

According to another aspect of the invention, the transfer of the eggs is in the opposite direction, thus from the second conveyor to the first conveyor. The eggs are thus transferred from the relatively fast narrower second conveyor to the wider relatively slow first conveyor. Practically the second conveyor will then be at a higher height level than the first conveyor.

Possible further embodiments of the assembly according to the invention are described below. The skilled person will readily contemplate that these further embodiments are also possible according to said other aspect of the invention if occasionally the direction in the definition is reversed.

The transfer device is preferably adapted to work in cycles, wherein in each cycle a set of eggs is received from the first conveyor by a subset of the transfer retainers and is dropped from said subset of transfer retainers in a subset of second egg retainers, and wherein the subsets of second egg retainers, in which egg sets of consecutive cycles are dropped from the transfer retainers, are directly after one another, i.e. without empty second egg retainers between the subsets of second egg retainers.

The first conveyor may move discontinuously, wherein it stands still when the eggs are dropped in egg retainers of the transfer conveyor, or the first conveyor may move continuously, although at low speed, at least a speed which is lower than the speed of the second conveyor.

In a practical embodiment the second conveyor circulates said at least one lane of second egg retainers in a horizontal plane.

In a practical embodiment the first conveyor circulates said plurality of lanes of first egg retainers in a vertical plane.

In a particular practical embodiment the first conveyor comprises a revolving wheel where the first egg retainers are turned around from an upstanding orientation to an upside-down orientation, and wherein the first egg retainers comprise pockets having gripping means to retain the eggs when the first egg retainers are in the upside-down orientation. A possible embodiment of these egg retainers forms another aspect of the invention and is described further below.

In a practical embodiment the transfer device circulates said at least one lane of egg transfer retainers in a horizontal plane. Preferably the second conveyor and transfer device have at least one section where the circulating lanes run in parallel and one above the other.

In a possible embodiment the endless element of the second conveyor is driven by an AC motor with frequency control.

In a possible embodiment the endless element of the transfer device is driven by a servo motor.

The egg transfer retainers of the transfer device may each comprise a pocket having a retaining state in which the egg can be received in the pocket from above and retained, and a releasing state in which the egg can be discharged from an underside of the pocket.

In a possible embodiment the second conveyor has one lane or two parallel lanes of second egg retainers.

In a possible embodiment the transfer device has a corresponding number of lanes of egg transfer retainers as the second egg conveyor.

In a possible embodiment the second conveyor has an oval path. Preferably the transfer device also has an oval path which is shorter than the oval path of the second conveyor.

In a possible embodiment the egg retainers of the transfer device are movable in a height direction to bring them selectively towards the egg retainers of the first conveyor to receive the eggs from the egg retainers of the first conveyor and/or selectively towards the egg retainers of the second conveyor to drop the eggs in the egg retainers of the second conveyor. The free-fall acceleration when eggs are dropped from the first conveyor egg retainers in the egg retainers of the transfer device or from the transfer device egg retainers in the second conveyor egg retainers is a limiting factor in terms of cycle time. This embodiment mitigates the effect of the free-fall acceleration by decreasing the height distance between the egg retainers of the transfer device and the egg retainers of the first conveyor, from which the eggs are dropped.

In a possible embodiment the egg retainers of the second conveyor are movable in a height direction to bring them selectively towards the egg retainers of the transfer device to receive the eggs from the egg retainers of the transfer device. The free-fall acceleration when eggs are dropped from the egg retainers of the transfer device into the egg retainers of the second conveyor is a limiting factor in terms of cycle time. This embodiment mitigates the effect of the free-fall acceleration by decreasing the height distance between the egg retainers of the transfer device and the egg retainers of the first conveyor, from which the eggs are dropped.

In another possible embodiment the egg retainers of the first conveyor are movable in a height direction to bring them selectively towards the egg retainers of the transfer device to drop the eggs in the egg retainers of the transfer device. The free-fall acceleration when eggs are dropped from the egg retainers of the first conveyor into the egg retainers of the transfer conveyor is a limiting factor in terms of cycle time. This embodiment mitigates the effect of the free-fall acceleration by decreasing the height distance between the egg retainers of the first conveyor, from which the eggs are dropped, and the egg retainers of the transfer device. Another aspect of the invention relates to egg retainers to be incorporated in egg conveyors.

Eggs may be oriented point up or point down in an egg retainer. In some circumstances it is necessary to receive or catch the eggs point up, to subsequently grip the egg and to turn around the egg retainer, such that the egg is held point down. A problem with catching eggs point up in an egg retainer formed as a gripper is that the lower end of the egg is weaker than the point of the egg. Furthermore a conventional egg gripper is less and less flexible towards the pivot point thereof. Therefor catching falling eggs point up in a conventional egg gripper has a considerable risk of forming cracks in the eggs.

Moreover, eggs may vary considerably in size. However, large eggs should be gripped sufficiently and small eggs should not be held too loosely in order to be able to turn around the egg retainer. In order to eventually place the egg in the package with the point downwards, it is necessary to maintain the orientation of the egg. Because the centre of gravity of an egg is above the widest section, the position of is not stable and the egg is inclined to tumble. In addition, small eggs can be as long as large eggs are wide, so that small eggs can lose their orientation during falling before the mentioned conventional gripper closes.

These problems are solved by an egg retainer for an egg conveyor, wherein said egg retainer comprises a pocket to receive an egg from above, and comprises movable gripping members which are arranged in the pocket and are movable between an open position in which an egg can be received or released from the pocket and a closed position in which the gripping members engage over an egg in the pocket to retain the egg in the pocket. In this egg retainer according to the invention the catch function and the gripping function are performed by different parts of the egg container: The pocket catches or receives the egg from above; the gripping members grip the egg and retain it.

A preferred embodiment of the egg retainer furthermore comprises a rigid carrier which is connectable to an endless conveyor, wherein the pocket is arranged in the carrier, and wherein the pocket is flexible to cushion eggs falling from above in the egg retainer. In this embodiment the pocket is thus specially adapted to minimize the risk of cracking the eggs.

In a possible embodiment of the egg retainer the movable gripping members are pivotably connected to the carrier. The gripping members are thus pivotally connected to a rigid part, i.e. the carrier.

In a possible embodiment the pocket converges from an upper side thereof towards a lower side thereof so as to form a tapering egg receiving space. This facilitates the catching of the egg and maintaining the egg in the point-up orientation when it is caught.

In a possible embodiment the pocket is formed of flexible elements, in particular flexible finger-like elements, which extend from an upper side towards a lower side of the egg retainer, an wherein the flexible elements converge from the upper side towards the lower side so as to form said tapering egg receiving space. Preferably the flexible finger-like elements each have a tip at a lower end, said tips of the flexible finger-like elements being free, i.e. not connected to each other or another part, such that the flexible finger-like elements can be elastically spread apart to a predetermined extent if an egg is pressed in the pocket so as to increase the egg receiving space.

In a possible further embodiment the flexible elements have an upper end, wherein the upper ends of the flexible elements are interconnected by an annular body. The annular body and the flexible finger-like elements may be formed as a monolithic body which constitutes the pocket.

Because the finger-like elements are only connected to each other at an upper side, the finger like elements will flex apart under the influence of the weight of the egg received in the pocket. Thereby the pocket thus adapts to the size of the egg and the egg will maintain its proper orientation. Since a smaller egg will have a smaller weight than a larger egg, the amount of flexing of the finger-like elements will be less than with a larger egg. The smaller egg will thus sink less deep into the pocket. As a result the point of the egg will be located within a predetermined height level range in which the gripping members are able to sufficiently grip the eggs from above.

In a further embodiment the carrier comprises stop members, which are located near the tips of the finger-like elements. The stop members are arranged and configured to limit the extent of spreading apart of the finger-like elements. The stop members thus warrant that the eggs cannot escape through the underside of the pocket.

In a possible embodiment of the egg retainer the pocket has openings, and wherein the gripping members can extend or move through said openings to engage over an egg in the pocket.

Each of the openings may be formed by a spacing between two of the finger-like elements. The pocket may be made of a plastic material, for example a Polyamide (PA), by injection moulding.

In a possible embodiment the gripping elements are configured as pivotable jaws which have parallel pivot axes. Each of the jaws may have two gripping fingers.

Each jaw may have an associated biasing member to bias the jaw to the open or closed position. The jaws may be brought to a closed position by an actuation element.

The invention also relates to an egg conveyor comprising egg retainers as described in the above, which are coupled to an endless element. The endless element may be a chain or the like which circulates driven by a motor. The egg retainers can be arranged on bars connected to the endless element and thus coupled to the endless element via the bars.

The invention will be further described in the following description with reference to the drawings.

DETAILED DESCRIPTION

Figure 1:
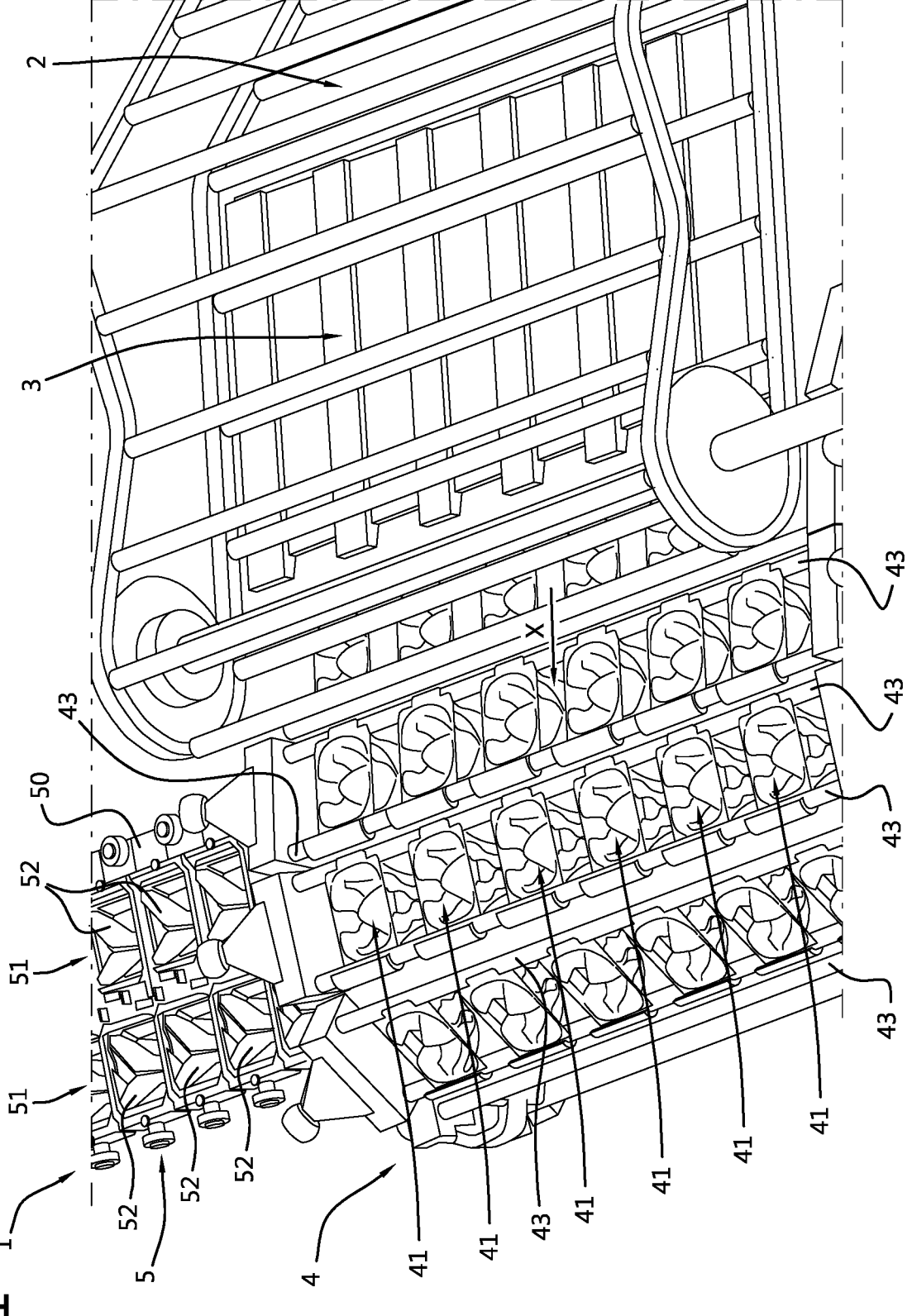
FIG. 1 shows a view in perspective from above of a practical embodiment of an egg conveyor assembly according to a first aspect of the invention.
Figure 2:
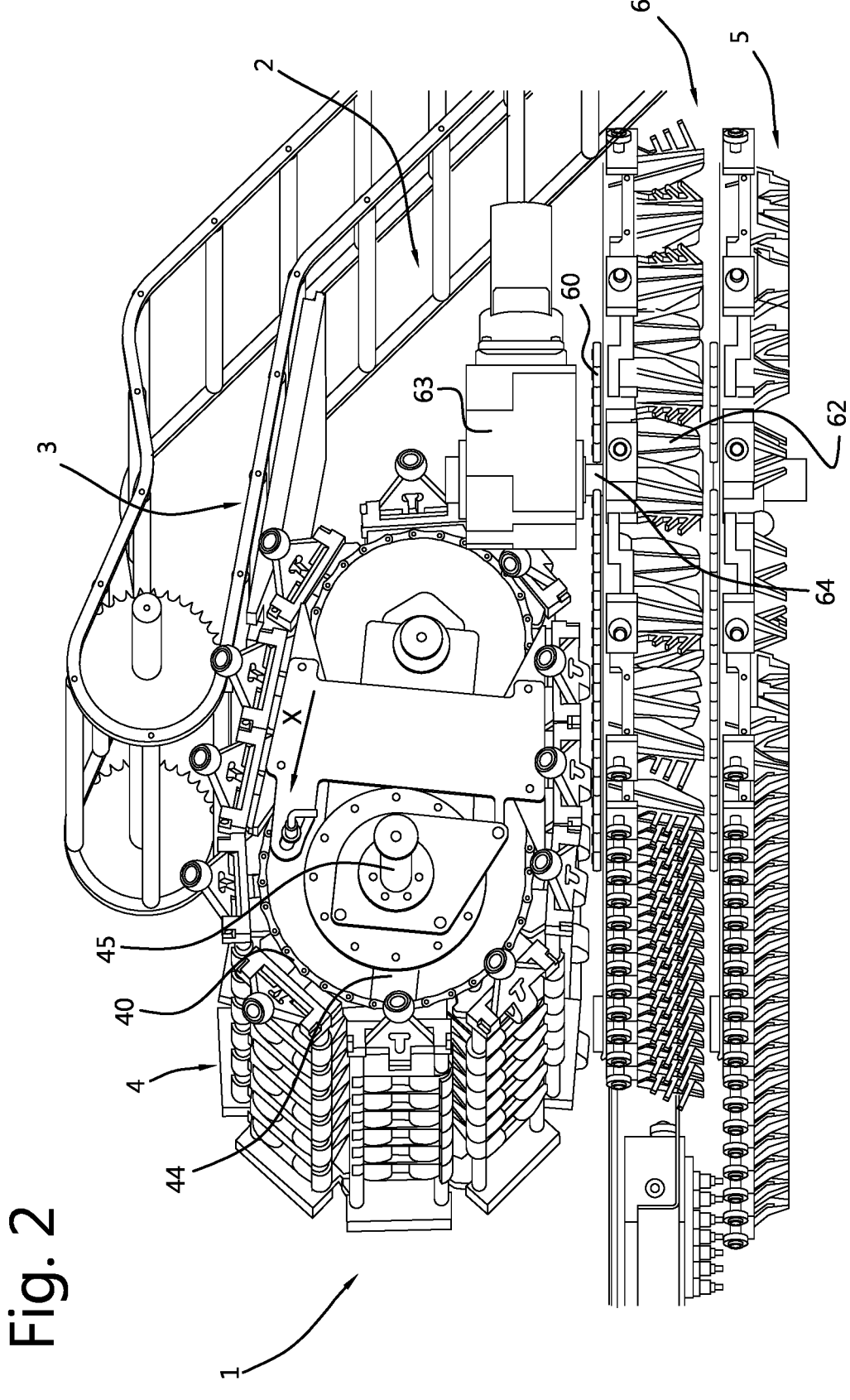
FIG. 2 shows a view in perspective from the side of the egg conveyor assembly of FIG. 1.
Figure 3:
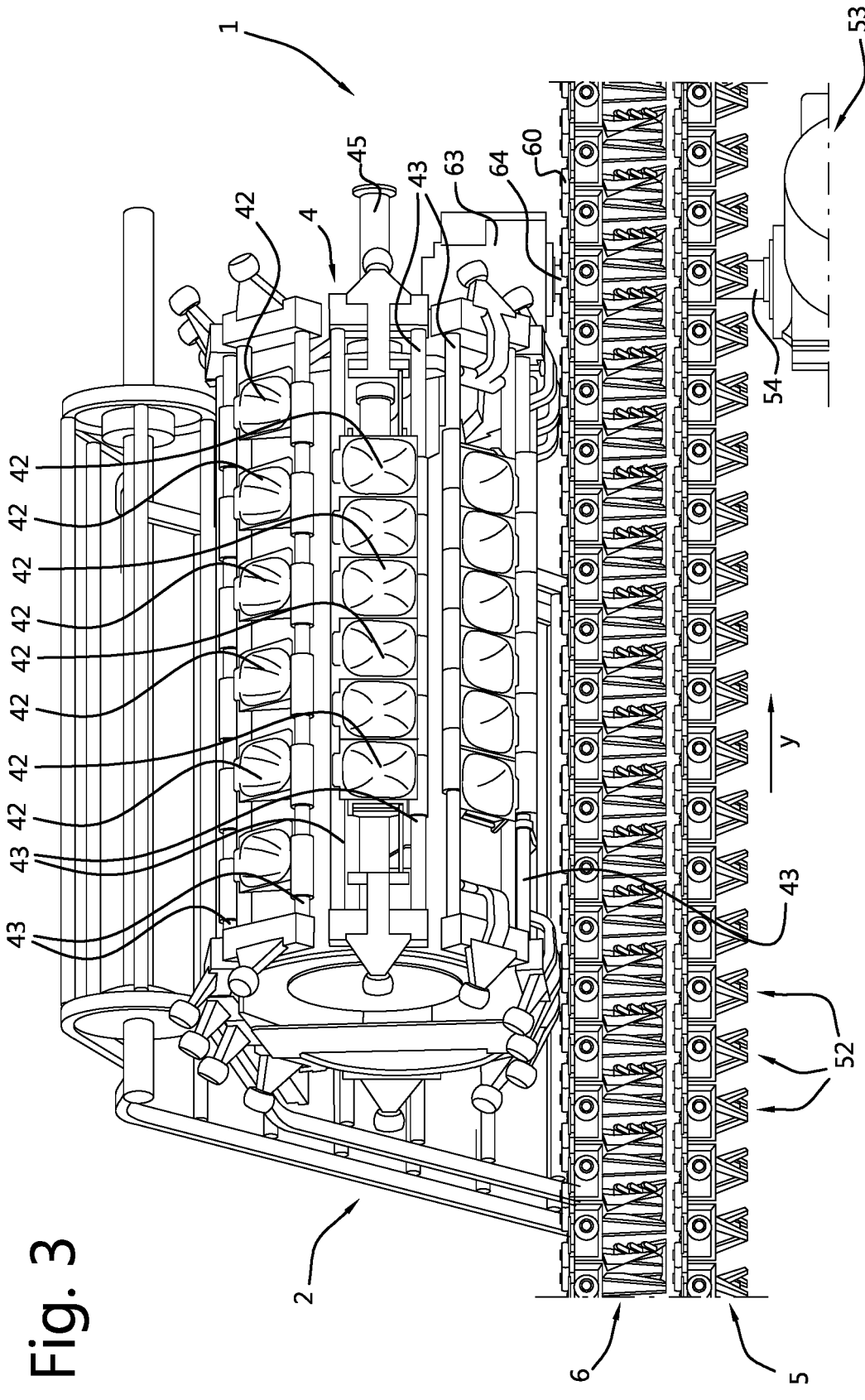
FIG. 3 shows yet another view in perspective of the egg conveyor assembly of FIG. 1, FIGS. 4-11 illustrate schematically the working of an egg conveyor assembly according to the invention in a view comparable with the view of FIG. 3, FIGS. 12-15 illustrate schematically the working of an egg conveyor assembly with an opposite configuration as the configuration of FIGS. 4-11, which is according to another aspect of the invention.

In FIGS. 1-3 a part of a practical embodiment of an egg conveyor assembly 1 according to the invention is shown. It is noted that some components are not drawn, and that other components are drawn in a simplified manner for the sake of clarity and visibility.

The conveyor assembly 1 in general is intended to be part of an egg grader assembly. An egg grader assembly is used in the egg processing industry to sort eggs in different grades based on size, weight, color, possible cracks and dirt on the egg shell, etc. Based on the grading the eggs are individually fed to a selected packaging lane or to a discharge path.

In the egg conveyor assembly 1 eggs are supplied by a multiple lane path 2 to an egg orientation device 3 having multiple lanes. The egg orientation device 3 is adapted to put eggs point up or point down in egg retainers of an egg conveyor. The principle and working of the specific egg orientation device 3 shown herein is described in EP 3256388 B1. The egg orientation device feeds the eggs to the egg conveyor assembly 1 of the present invention.

The egg conveyor assembly 1 comprises a first conveyor 4 and a second conveyor 5 arranged on a lower height level than the first conveyor 4. The first conveyor 4 comprises an endless element 40, embodied in this case as a chain, or possibly two chains, one on either lateral side of the conveyor. In this specific embodiment shown in FIGS. 1-3 the first conveyor 4 has six lanes 41 of first egg retainers 42 connected to the endless element 40 and extending in a first conveyor direction X. The egg retainers 42 are arranged in rows on transversal bars 43 which are connected with the endless element 40. On the transversal bars 43 the pitch between the egg retainers 42 of one row can be varied. As can be best seen in FIG. 3 the pitch is larger as the eggs are received from the egg orientation device 3 on the upper run of the first conveyor 4, and is decreased when the egg retainers 42 are rotating around a revolving wheel 44 of the first conveyor 4.

The first conveyor 4 can be driven by a drive motor (not shown) which acts on a spindle 45 which is connected with the revolving wheel 44.

The egg retainers 42 of the first conveyor 4 comprise pockets having gripping means to retain the eggs when the first egg retainers are in the upside-down orientation. The egg retainers 42 thus receive the eggs from above in the upper run of the first conveyor 4 and then hold the egg with the gripping means such that the eggs do not fall out when the egg retainer 42 turned around at the revolving wheel 44 from an upstanding orientation, at the end of the upper run of the first conveyor 4, to an upside-down orientation, at the start of the lower run of the first conveyor 4. Ultimately the eggs are thus suspended in the first conveyor 4. Since the eggs are initially dropped with the point up by the egg orientation device 3, the eggs will ultimately be suspended point down in the egg conveyor 4.

The egg retainers 42 will be described in detail further below with reference to FIGS. 21-26.

The second egg conveyor 5 is embodied as a so called "egg chain", which extends in a conveyor direction Y perpendicular to the conveyor direction X. The second conveyor 5 comprises an endless element 50 and in this example two lanes 51 of second egg retainers 52 connected to the endless element 50. The second conveyor 5 circulates the lanes 51 of second egg retainers 52 in a horizontal plane. The endless element 50 runs around sprockets having a vertical rotational axis. The second conveyor 5 may have for example an oval path, but may also have another shaped path. One of the sprockets may be driven by a drive motor 53 via an outgoing shaft 54 of the motor 53. The drive motor 53 may in practise be an AC motor with frequency control. The drive motor 53 is adapted to drive the second conveyor 5 to run continuously at a constant speed $v_2$. In other words, the drive motor 53 is controllable by control means.

A transfer device 6 is arranged between the first conveyor 4 and the second conveyor 5. The transfer device 6 is adapted to transfer eggs from the first conveyor 4 to the second conveyor 5.

In the practical embodiment shown in FIGS. 1-3 the transfer device 6 includes a transfer conveyor which is embodied as an egg chain, similar to the second conveyor 5, but then shorter. It may for example also define an oval path. The transfer conveyor comprises and endless element 60 and in this case two lanes of egg transfer retainers 62 connected to the endless element 60 and extending in the second conveying direction Y.

The egg transfer retainers 62 are adapted to receive the eggs from above from the first conveyor 4. The first conveyor 4 simultaneously drops eggs from one row in the egg transfer retainers 62 of the transfer device 6. The egg transfer retainers 62 of the transfer device 6 each comprise an operable pocket having a retaining state in which the egg can be received in the pocket from above and retained, and a releasing state, or open state, in which the egg can be discharged from an underside of the pocket.

The transfer conveyor 6 circulates the lanes of the egg transfer retainers 62 in a horizontal plane. The endless element 60 runs around sprockets having a vertical rotational axis. One of the sprockets may be driven by a drive motor 63 via an outgoing shaft 64 of the motor 63. The drive motor 63 may be a servomotor, which can be controlled by a control system which controls the speed of the transfer conveyor. The second conveyor 5 and transfer device 6, which are arranged in parallel horizontal planes are arranged such that they have at least one section where the circulating lanes of the second conveyor 5 and the transfer conveyor run in parallel and one above the other. In this section the egg transfer device 6 releases the eggs in the second egg retainers 52 of the second conveyor 5.

The operation of the egg conveyor assembly 1 will be further elucidated with reference to the schematic FIGS. 4-11, in which the relevant components will be indicated with the same reference numerals as in the foregoing.

In FIG. 4 is shown an initial state wherein eggs 10 (in this schematic drawing depicted as a circles) are located on a lower run of the first conveyor 4 and are suspended in the first egg retainers 42. At this moment the first conveyor is standing still. The eggs 10 are located above a subset 65 of the egg retainers 62 of the transfer device 6, which subset 65 is indicated by a dashed box. The transfer device 6 is standing still and the speed $v_t$ of the transfer device is thus 0 m/s.

Next the eggs 10 are released by the first egg retainers 42 of the first conveyor 4, which is illustrated in FIG. 2. The eggs 10 drop towards the transfer conveyor 6. The speed $v_t$ of the transfer device 6 is still 0 m/s.

In FIG. 6 the moment is illustrated at which the eggs 10 are received in the subset 65 of transfer retainers 62 of the transfer device 6. At this moment the speed of the transfer device 6 is still 0 m/s. In the meantime the second conveyor 5 is moving continuously at a speed $v_2$. In a practical embodiment this speed may be between 0.5 and 1 m/s, which will be used as an example here. The situation shown in FIG. 6 is 150 ms after the start of the cycle.

In FIG. 6 is indicated a subset 55 of second egg retainers 52 by a dashed box, in which the eggs held in the subset 65 of the transfer device will be dropped. As can be seen in FIG. 6 the retainers 52 of the subset 55 and the retainers 62 of the subset 65 are not yet in register. After the eggs 10 are received in the subset 65 of the transfer device 6, the transfer device 6 is accelerated by the drive motor 63 and the associated control system to a speed that corresponds to the speed of the second conveyor 5. The situation wherein he retainers 62 of the subset 65 are in register with the retainers 52 of the subset 55 and the transfer device 6 has reached the speed of the second conveyor ($v_t=v_2$), is illustrated in FIG. 7, which is after 270 ms.

Figures 8, 9, 10, 11:
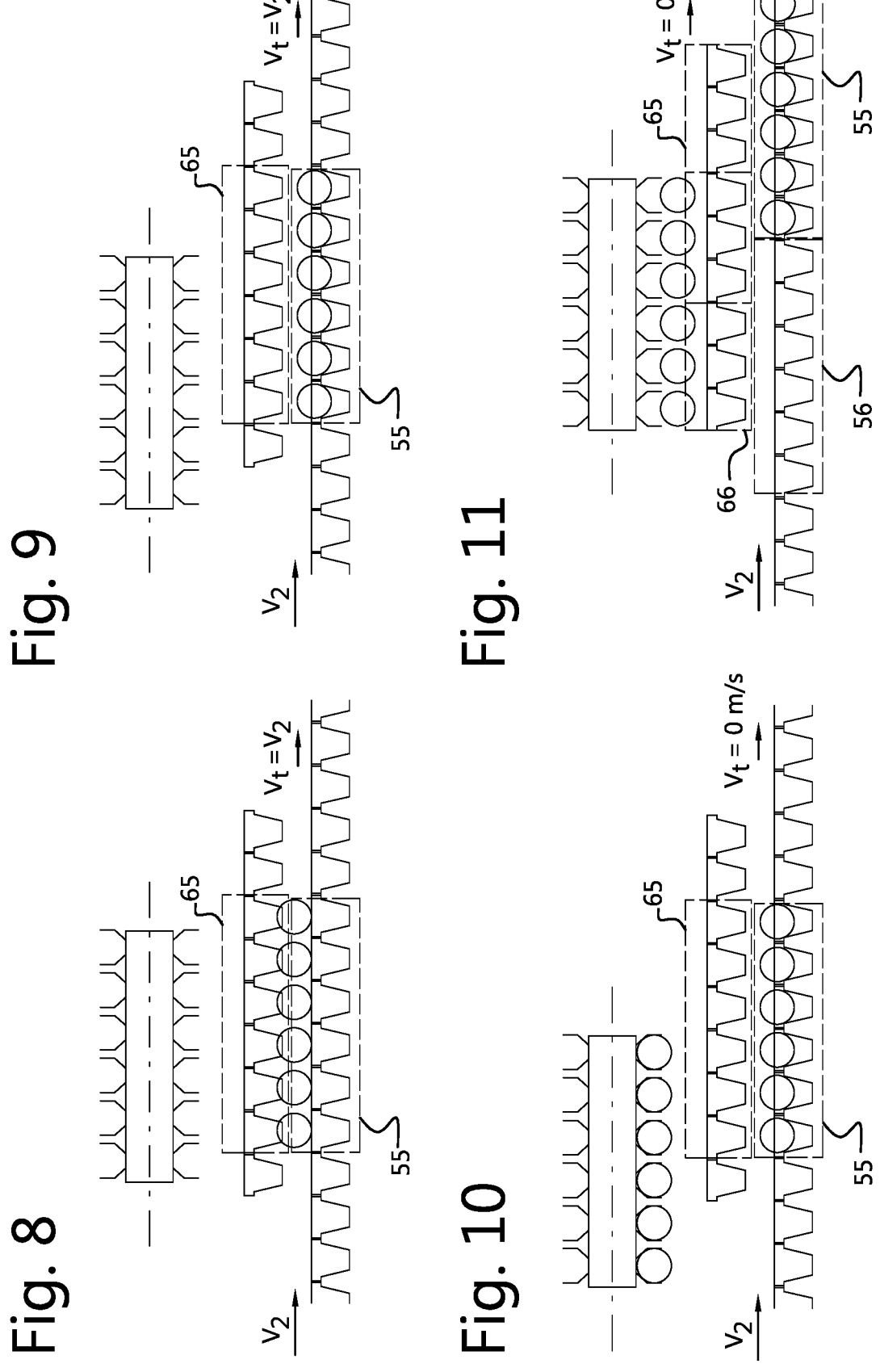

Next, the eggs 10 can be dropped from the retainers 62 of the transfer device 6 in the retainers 52 of the second conveyor 5 while the subsets 55 and 65 of the second conveyor 5 and the transfer device 56 move simultaneously, as is illustrated in FIGS. 8 and 9. The situation of FIG. 9 is 420 ms after the start of the cycle.

When the eggs have been received in the retainers 52 of the second conveyor 5, the transfer device 6 can be decelerated to a standstill, thus $v_t=0$ m/s. In the meantime new eggs 10 are suspending from the first conveyor 4, ready to be dropped in the retainers of the transfer device as can be seen in FIG. 10. This is 540 ms after the start of the cycle. The cycle now recommences. As can be seen in FIG. 11 a new subset 66 of transfer retainers 62 is ready to receive the eggs 10 from the first conveyor 4. The new subset 66 has an overlap of here egg retainers 62 with the previous subset 65 as is indicated in FIG. 11. As is also visible in FIG. 11 is that the new subset 56 of second egg retainers 52 of the second conveyor 5 is directly after the previous subset 55 without empty retainers 52 between the two subsets 55 and 56.

It is noted that the first conveyor 4 can have a low constant speed, but is also possible to rotate the revolving wheel intermittently.

Furthermore it is noted that the speeds and times mentioned in the above are only an example, but indicate the order of magnitude of speeds and cycle times feasible in practice.

Figure 12:
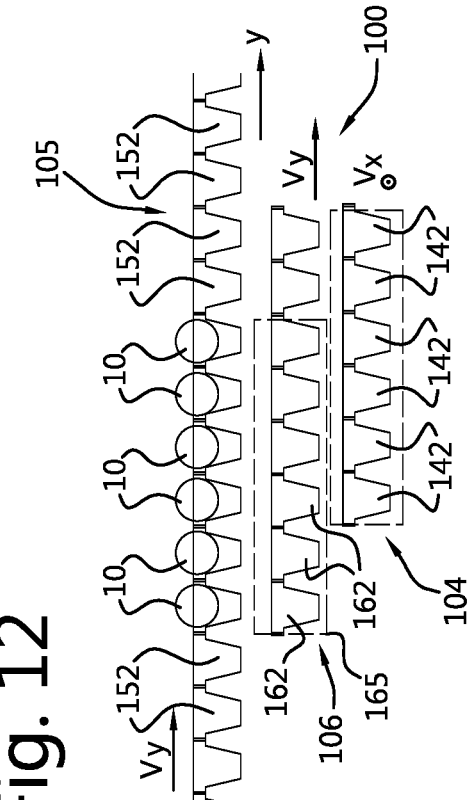

In FIG. 12 is shown a different conveyor assembly as is shown in the previous figures. This assembly 100 comprises a first conveyor 104 and a second conveyor 105, wherein the second conveyor 105 is situated on a higher level than the first conveyor 104.

The first conveyor 104 may comprise an endless element, embodied for example as a chain, or possibly two chains, one on either lateral side of the conveyor. In this specific embodiment the first conveyor 104 has six lanes of first egg retainers 142 connected to the endless element and extending in a first conveyor direction X which is perpendicular to the plane of the drawing. In the Figure only a transverse row of first egg retainers 142 is shown. The first conveyor 104 can be driven by a drive motor (not shown).

The second egg conveyor 105 is embodied as a so called "egg chain", which extends in a conveyor direction Y perpendicular to the conveyor direction X. The second conveyor 105 comprises an endless element at least one lane of second egg retainers 152 connected to the endless element. The second conveyor 105 circulates the at least one lane of second egg retainers 152 in a horizontal plane. The endless element runs around sprockets having a vertical rotational axis. The second conveyor 105 may have for example an oval path, but may also have another shaped path. One of the sprockets may be driven by a drive motor. The drive motor may in practise be an AC motor with frequency control. The drive motor is adapted to drive the second conveyor 105 to run continuously at a constant speed $v_y$.

A transfer device 106 is arranged between the first conveyor 104 and the second conveyor 105. The transfer device 106 is adapted to transfer eggs from the second conveyor 105 to the first conveyor 104.

In the practical embodiment shown in FIGS. 1-3 the transfer device 106 includes a transfer conveyor which is embodied as an egg chain, similar to the second conveyor 105, but shorter. It may for example also define an oval path. The transfer conveyor comprises and endless element and includes at least one lane of egg transfer retainers 162 connected to the endless element and extending in the second conveying direction Y. The number of lanes of the transfer conveyor 106 is the same as the number of lanes of the second conveyor 105.

In FIG. 12 is shown an initial state wherein eggs 10 are located in egg retainers 152 of the second conveyor 105. In the figure the egg retainers 152 to the left are depicted empty, but these are in practise filled with eggs. The second conveyor 105 is moving at a speed $v_y$. The eggs 10 are located above a subset 165 of the egg retainers 162 of the transfer device 106, which subset 165 is indicated by a dashed box. The transfer device 106 moves with the same speed $v_y$ as the second conveyor 105. The egg retainers 162 of the subset 165 thus remain underneath the egg retainers 152 of the second conveyor 105.

Figure 13:
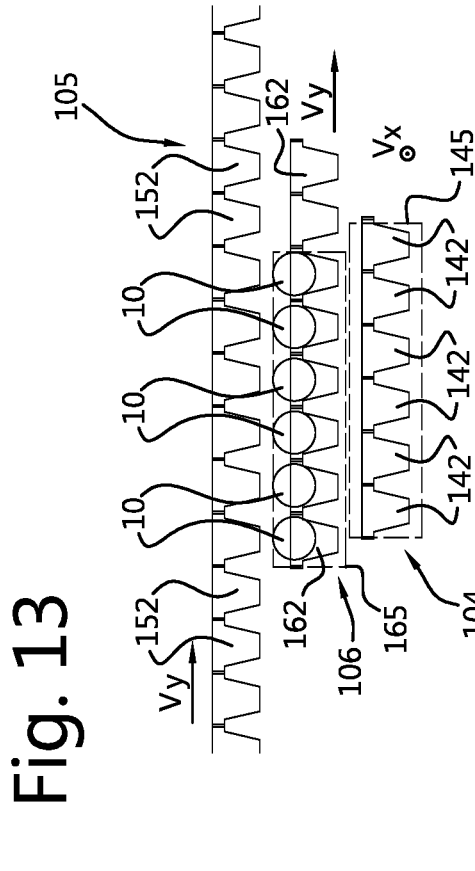

Next the eggs 10 are released by the second egg retainers 152 of the second conveyor 105. The eggs 10 drop towards the transfer conveyor 106. In FIG. 13 the moment is illustrated at which the eggs 10 are received in the subset 165 of transfer retainers 162 of the transfer device 106. At this moment the speed of the transfer device 6 is still the same as the speed $v_y$ of the second conveyor 105.

Figure 14:
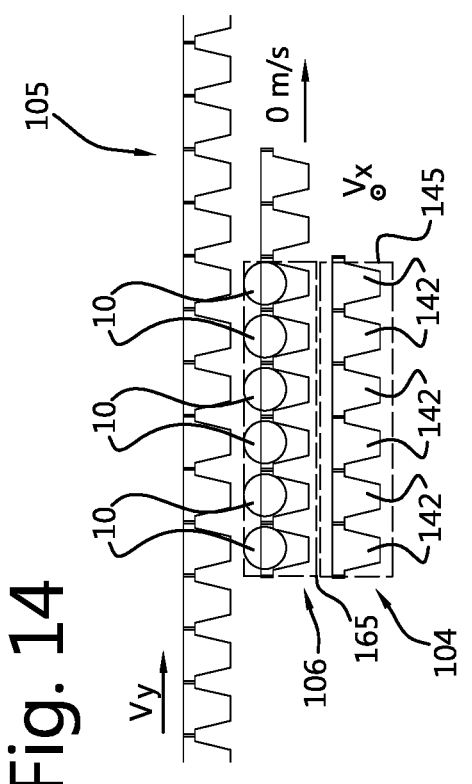

In FIG. 13 is indicated a subset 145 of first egg retainers 142 by a dashed box, in which the eggs held in the subset 165 of the transfer device will be dropped. As can be seen in FIG. 13 the egg retainers 142 of the subset 145 and the egg retainers 162 of the subset 165 are not yet in register. After the eggs 10 are received in the subset 165 of the transfer device 106, the speed of the transfer device 106 is reduced by the associated drive motor and the associated control system to zero. The situation wherein the egg retainers 162 of the subset 165 are in register with the egg retainers 142 of the subset 145 and the transfer device 106 has reached the speed of 0 m/s, is illustrated in FIG. 14.

Figure 15:
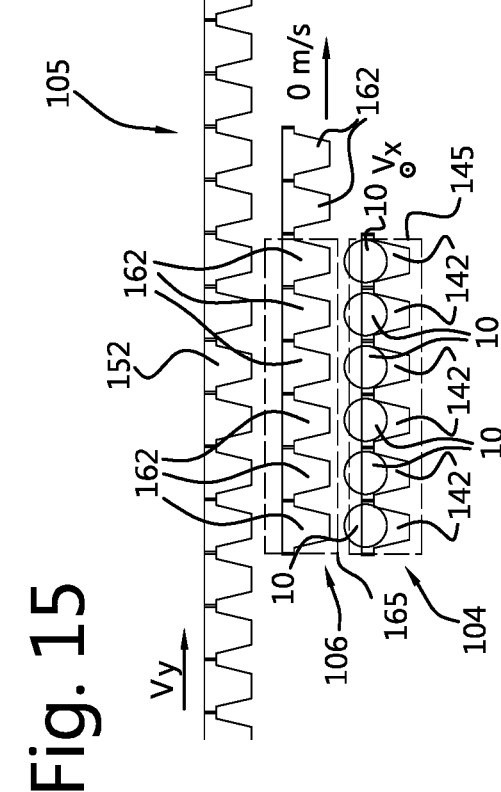

Next, the eggs 10 can be dropped from the egg retainers 162 of the transfer device 106 in the egg retainers 142 of the first conveyor 104 while the subsets 145 and 165 of the first conveyor 104 and the transfer device 106 are both standing still, at least in the Y-direction. This situation is shown in FIG. 15. The first conveyor 104 may stand still in the X-direction, or it may move at a low speed in the X-direction. Thus, the speed of the first conveyor 104 is controllable by control means. The eggs 10 are dropped from the transfer device 106 into the subset 145 of the first conveyor 104 when the subset 145 is in register with the subset 165 of the transfer device 106 both in the X-direction and the Y-direction.

In this situation shown in FIG. 15.

When the eggs have been received in the egg retainers 142 of the first conveyor 104, the transfer device 106 can be accelerated to a speed $v_y$ corresponding to the speed $v_y$ of the second conveyor 105. In the meantime new eggs 10 are supplied by the second conveyor 105, ready to be dropped in the egg retainers 162 of the transfer device 106. The eggs 10 in the subset 145 of the first conveyor 104 are moved in the X-direction and empty egg retainers 142 are moved in place, whereby the state of FIG. 12 is reached and a new cycle can start.

Figures 16, 17, 18, 19:
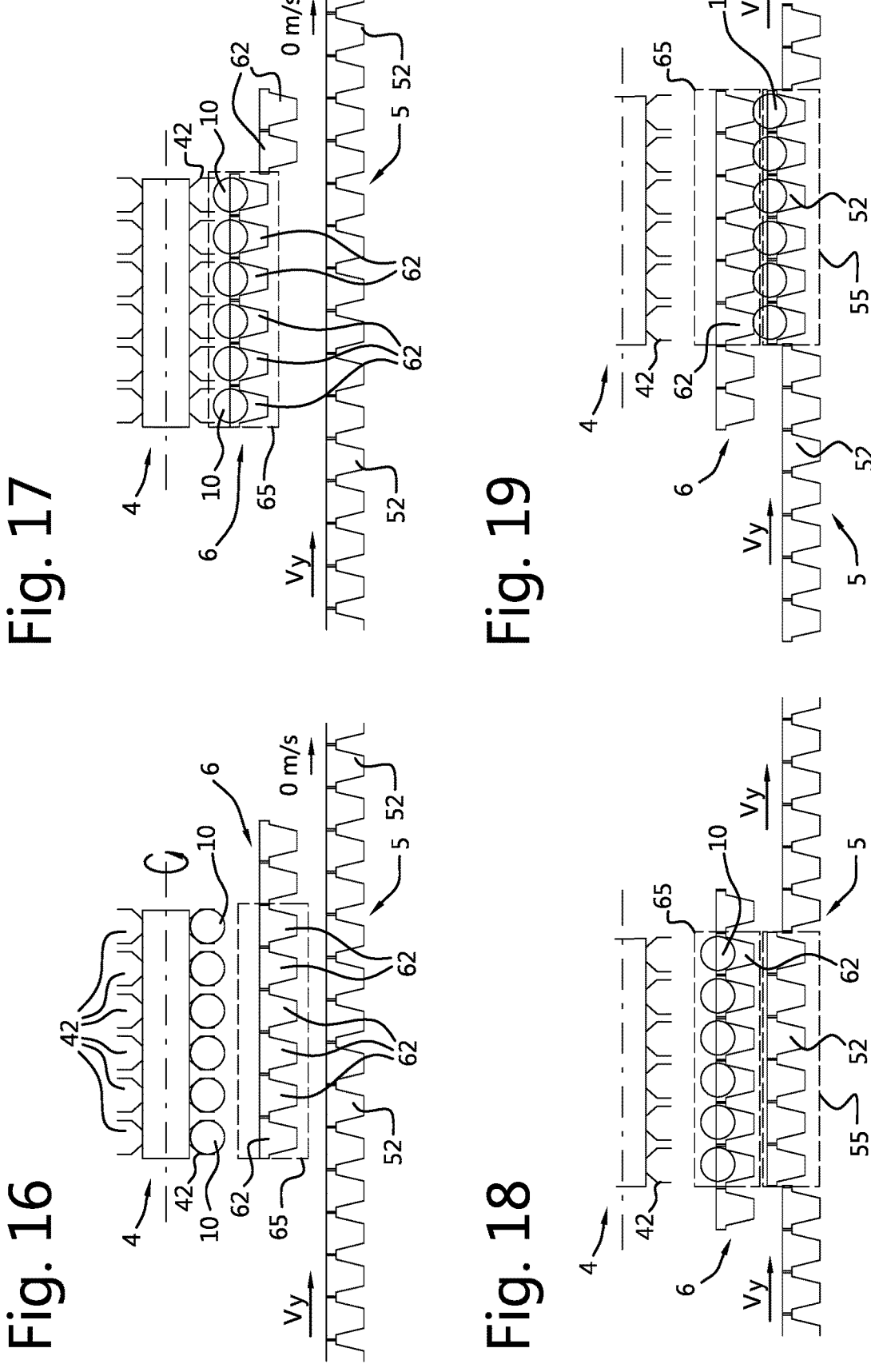
FIGS. 16-20 illustrate schematically the working of a possible further embodiment of an egg conveyor assembly according to the first aspect of the invention.

In FIG. 16 is schematically shown a conveyor assembly 201, which is similar to the assembly 1 shown in FIG. 4. Therefore, the same reference numerals are used in FIGS. 16-20 for the same parts as in the FIGS. 4-11. For a description of the components and configuration of the conveyor assembly, reference is made to the above description referring to FIGS. 1-11.

In this conveyor assembly 201 the difference with the conveyor assembly 1 is that the transfer conveyor 6 and the second conveyor 5 are able to move a respective subset 65 and 55 of the egg retainers 62, 52 upwardly to bring them closer to the egg retainers of the first conveyor 4 and the transfer conveyor 6. respectively. Thereby the effect of the free-fall acceleration can be reduced and the cycle times can be reduced.

In FIG. 16 is shown how the subset 65 of egg retainers 62 of the transfer device 6 is in register with the egg retainers 42 of the first conveyor 4 holding eggs 10. The conveyor of the transfer device 6 is standing still in this state. The subset 65 of egg retainers 62 is lifted and brought closer to the suspending eggs 10. In FIG. 17 is illustrated the situation in which the eggs 10 are dropped and fall into the egg retainers 62 of the transfer device 6. The falling height and thus the falling time is reduced by bringing the egg retainers 62 of the subset 65 upwardly.

Next the transfer device 6 is accelerated to a speed $v_y$ corresponding to the speed of the second conveyor 5. The egg retainers 62 of the subset 65 are brought down again to the normal height level, as is visible in FIG. 18. A subset 55 of egg retainers 52 of the second conveyor 5 is moved upwardly and brought closer to the underside of the egg retainers 62 of the transfer device 6. Thereby the falling height and thus the falling time is reduced. This state is shown in FIG. 18. In FIG. 19 is shown the state in which the eggs 10 are received in the egg retainers 52 of the second conveyor 5.

Figure 20:
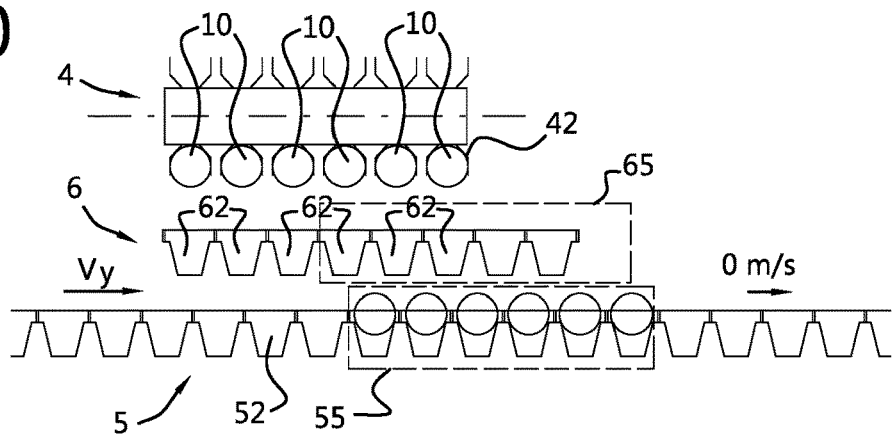

In FIG. 20 is shown the state in which the egg retainers 62 of the subset 65 are moved downwardly again to the normal height level. In the meantime the transfer device 6 is decelerated to standstill. The first conveyor 4 has a new set of eggs 10 ready and in register with a new subset of egg retainers 62 of the transfer device 6. The state of FIG. 20 thus corresponds to the state in FIG. 16 and a new cycle begins.

Figure 26A:
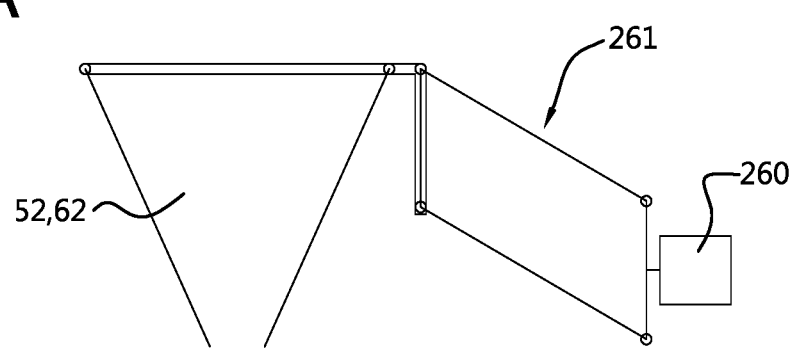
Figure 26B:
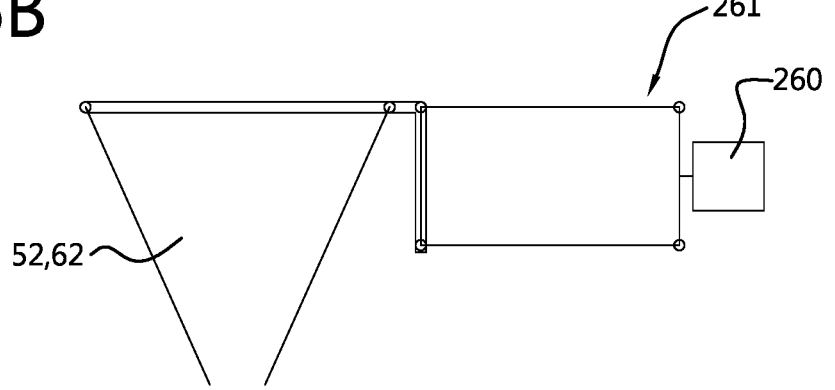
Figure 26C:
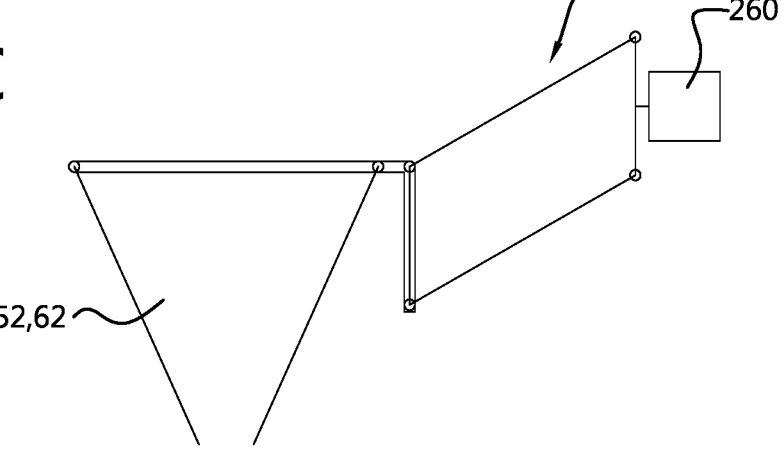

In FIG. 26A-26C is schematically shown how the egg retainers 52 or 62 can be brought upwardly (FIG. 26A) or downwardly (FIG. 26C) with respect to a central position (FIG. 26B). The egg retainers 62 may be connected to a chain 260 by means of a parallelogram construction 261.

Figure 22:
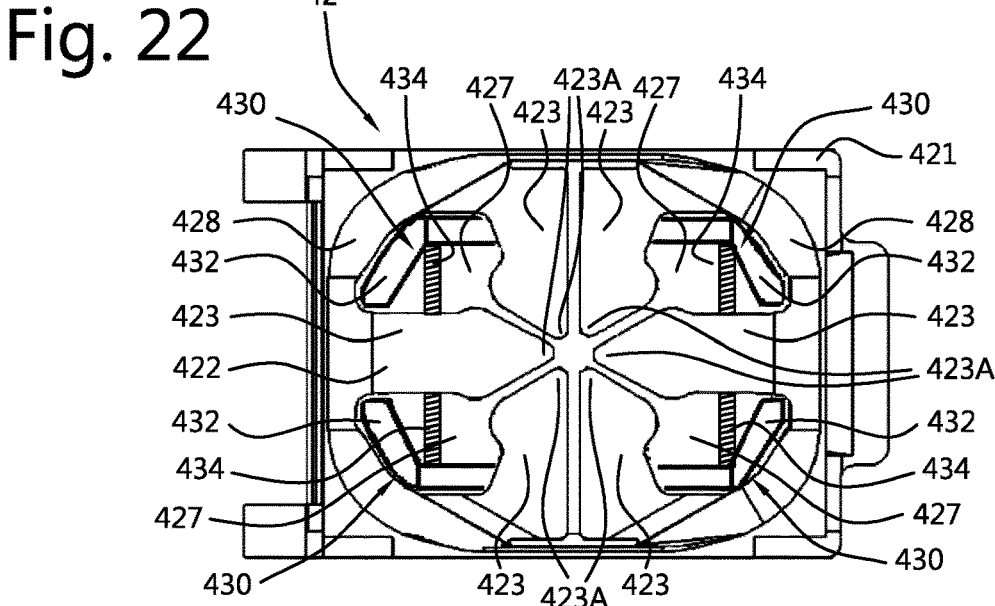
FIG. 22 shows a top elevational view of the egg retainer of FIG. 21.
Figure 21:
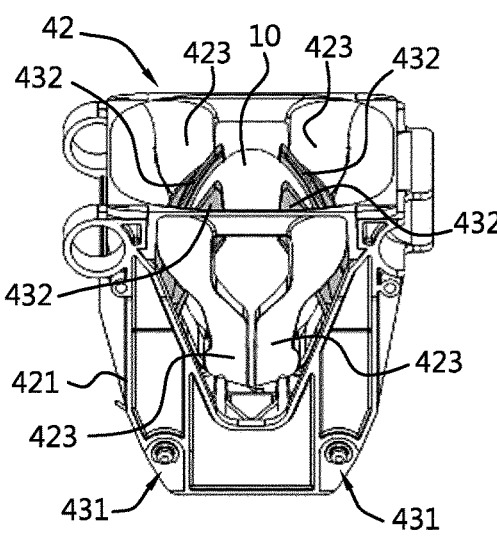
FIG. 21 shows a view in perspective of a preferred embodiment of an egg retainer according to another aspect of invention.

In FIGS. 21 and 22 an egg retainer 42 is shown separately which can be applied in an endless conveyor, for example the first conveyor 4 as described in the above. The egg retainer 42 comprises a carrier 421. The carrier 421 is a rigid part which is connectable on a front end and a rear end with the same carriers so as to form a lane of egg retainers as is best visible in FIGS. 1 and 3.

A pocket 422 is arranged in the carrier 421. The pocket 422 is flexible and comprises a plurality of finger-like elements 423. In the example shown in the figures the pocket 422 has six finger-like elements 423. The finger-like elements 423 extend from an upper side 425 towards a lower side 426 of the egg retainer and converge towards each other from the upper side 425 towards the lower side 426 so as to form a tapering egg receiving space 424, cf. FIG. 25A. The finger-like elements 423 are flexible and are adapted to give in when pressure is applied on them by an egg received in the pocket 422.

The flexible finger-like elements 423 each have a tip 423A at a lower end. The tips 423A of the flexible finger-like elements 423 are not connected to each other or another part, such that the flexible finger-like elements 423 can be elastically deformed and spread apart to a predetermined extent if an egg 10 is pressed in the pocket 422 so as to increase the egg receiving space 424. The flexible finger-like elements 423 have upper ends which are interconnected by an annular body 428. The annular body 428 and the finger-like elements 423 are preferably made in one-piece.

Figure 23:
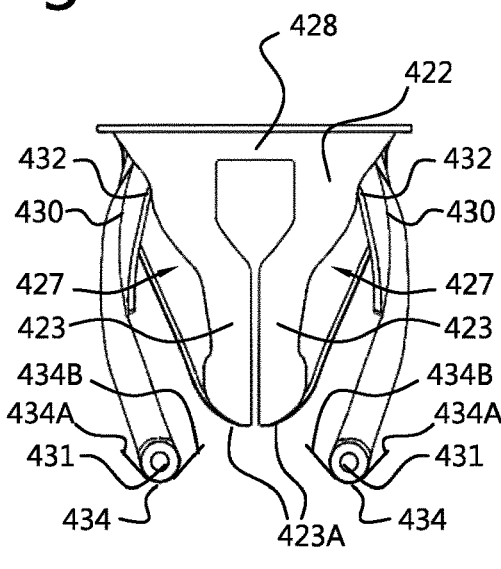
FIG. 23 shows a side elevational view of the egg retainer of FIG. 21 wherein the carrier is omitted.
Figures 24A, 24B, 24C, 25A, 25B:
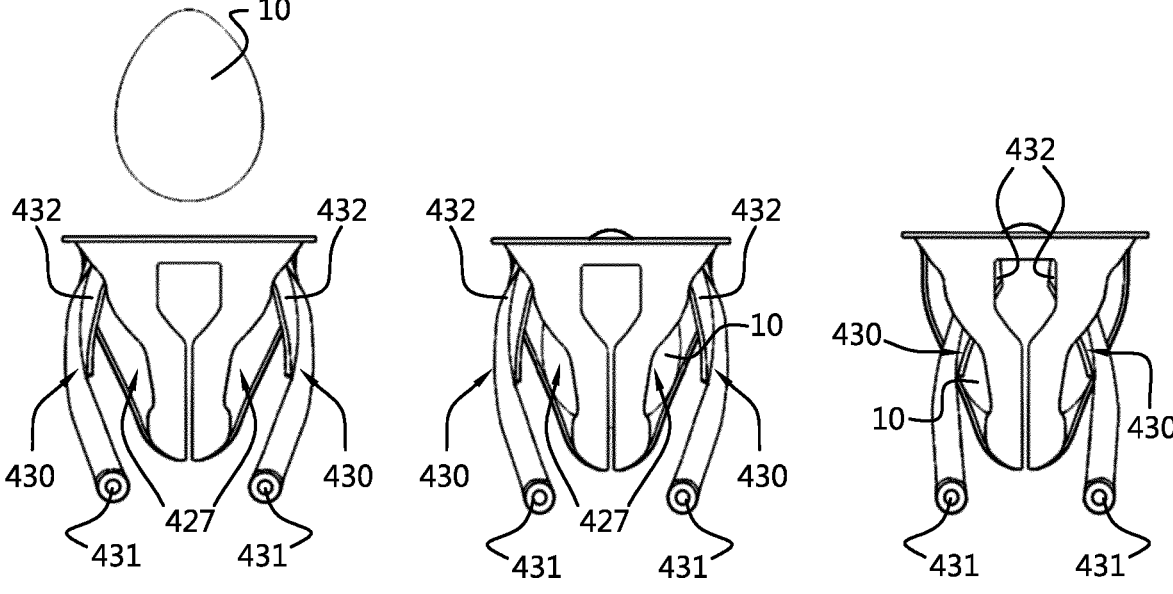
FIGS. 24A-24C illustrate the reception and gripping of an egg in the egg retainer of FIG. 21, FIGS. 25A-25B illustrate schematically in cross section the reception of an egg in the egg retainer of FIG. 21, and FIGS. 26A-26C illustrate schematically a mechanism to bring egg retainers of a conveyor upwardly or downwardly.

The pocket 422 has openings 427 formed by a spacing between two of the finger-like elements 423. The egg retainer 42 includes gripping members 430 which extend and can move through said openings 427 to engage over an egg in the pocket as is shown in FIG. 21 and illustrated in FIGS. 24A-24C. The movable gripping members 430 are pivotably connected to the carrier 421. The gripping members 430 are configured as pivotable jaws which have parallel pivot axes at pivots 431. Each of the jaws has two gripping fingers 432. Each jaw may have an associated biasing member to bias the jaw to the open or closed position. The biasing member may be a spring, for example a spiral spring 434 which has a longitudinal axis which is coaxial with the pivot axis of the jaw, and which spring 434 has one end 434A that engages the jaw and another end 434B that engages the carrier 421. The springs 434 are shown in FIGS. 22 and 23.

The egg retainer 42 also includes stop members 433. The stop members 433 are in one embodiment part of the carrier 421. The stop members 433 are located near the tips 423A of the finger-like elements 423 as is visible in FIGS. 25A and 25B. The stop members 433 are arranged and configured to limit the extent of spreading apart of the finger-like elements 423. The stop members 433 thus warrant that the eggs cannot escape through the underside of the pocket 422.

The invention claimed is:

1. An egg conveyor assembly comprising:
   a first conveyor comprising and endless element and a plurality of lanes of first egg retainers connected to the endless element and extending in a first conveyor direction (X),
   a second conveyor arranged on a lower height level than the first conveyor and comprising an endless element and at least one lane of second egg retainers connected to the endless element and extending in a second conveyor direction (Y) transverse to the first conveyor direction (X),
   a transfer device arranged on a height level between the first conveyor and the second conveyor and adapted to transfer eggs from the first conveyor to the second conveyor and comprising egg transfer retainers adapted to receive the eggs from above from the first conveyor, and adapted to release the eggs in the second egg retainers of the second conveyor,
   wherein the transfer device includes a transfer conveyor comprising an endless element and at least one lane of said egg transfer retainers connected to the endless element and extending in the second conveyor direction (Y),
   wherein, in use, the second conveyor circulates said at least one lane of second egg retainers continuously, and the transfer conveyor circulates said at least one lane of egg transfer retainers discontinuously, in such a way that the lane of egg transfer retainers of the transfer device is approximately standing still when receiving eggs from the first conveyor, and such that the lane of egg transfer retainers of the transfer device is moving approximately synchronously with the lane of second egg retainers of the second conveyor when dropping the eggs in the second egg retainers of the second conveyor, and
   wherein the second conveyor and the transfer device are arranged such that they have at least one section where circulating lanes of the second conveyor and the transfer conveyor run in parallel and one above the other, in which section the transfer device releases the eggs in the second egg retainers of the second conveyor.

2. The egg conveyor assembly according to claim 1, wherein the transfer device is adapted to work in cycles, wherein in each cycle a set of eggs is received from the first conveyor by a subset of the transfer retainers and is dropped from said subset of transfer retainers in a subset of second egg retainers, and wherein the subsets of second egg retainers, in which egg sets of consecutive cycles are dropped from the transfer retainers, are directly after one another, i.e. without empty second egg retainers between the subsets of second egg retainers.

3. The egg conveyor assembly according to claim 1, wherein the first conveyor circulates said plurality of lanes of first egg retainers discontinuously.

4. The egg conveyor assembly according to claim 1, wherein the first conveyor circulates said plurality of lanes of first egg retainers continuously at a speed which is lower than the speed of the second conveyor.

5. The egg conveyor assembly according to claim 1, wherein the second conveyor circulates said at least one lane of second egg retainers in a horizontal plane.

6. The egg conveyor assembly according to claim 1, wherein the first conveyor circulates said plurality of lanes of first egg retainers in a vertical plane.

7. The egg conveyor assembly according to claim 1, wherein the first conveyor comprises a revolving wheel where the first egg retainers are turned around from an upstanding orientation to an upside-down orientation, and wherein the first egg retainers comprise pockets having gripping means to retain the eggs when the first egg retainers are in the upside-down orientation.

8. The egg conveyor assembly according to claim 1, wherein the transfer device circulates said at least one lane of egg transfer retainers in a horizontal plane.

9. The egg conveyor assembly according to claim 1, wherein the endless element of the second conveyor is driven by an AC motor with frequency control.

10. The egg conveyor assembly according to claim 1, wherein the endless element of the transfer device is driven by a servo motor.

11. The egg conveyor assembly according to claim 1, wherein the egg transfer retainers of the transfer device each comprise a pocket having a retaining state in which the egg can be received in the pocket from above and retained, and a releasing state in which the egg can be discharged from an underside of the pocket.

12. The egg conveyor assembly according to claim 1, wherein the second conveyor has one lane or a plurality of parallel lanes of second egg containers, in particular two, three or four parallel lanes of second egg conveyors.

13. The egg conveyor assembly according to claim 12, wherein the transfer device has a corresponding number of lanes of egg transfer retainers as the second egg conveyor.

14. The egg conveyor assembly according to claim 1, wherein the second conveyor has an oval path.

15. The egg conveyor assembly according to claim 14, wherein the transfer device has an oval path which is shorter than the oval path of the second conveyor.

16. The egg conveyor assembly according to claim 1, wherein the first conveyor has multiple lanes thereby forming transverse rows of first egg retainers, and is adapted to simultaneously drop eggs from one row in the egg transfer retainers of the transfer device.

17. The egg conveyor assembly according to claim 1, wherein the egg retainers of the transfer device are movable in a height direction to bring them selectively towards the egg retainers of the first conveyor to receive the eggs from the egg retainers of the first conveyor and/or selectively towards the egg retainers of the second conveyor to drop the eggs in the egg retainers of the second conveyor.

18. The egg conveyor assembly according to claim 1, wherein the egg retainers of the second conveyor are movable in a height direction to bring them selectively towards the egg retainers of the transfer device to receive the eggs from the egg retainers of the transfer device.

19. The egg conveyor assembly according to claim 1, wherein the egg retainers of the first conveyor are movable in a height direction to bring them selectively towards the egg retainers of the transfer device to drop the eggs in the egg retainers of the transfer device.

20. An egg conveyor assembly comprising:
a first conveyor comprising and endless element and a plurality of lanes of first egg retainers connected to the endless element and extending in a first conveyor direction (X),
a second conveyor arranged on a higher height level than the first conveyor and comprising an endless element and at least one lane of second egg retainers connected to the endless element and extending in a second conveyor direction (Y) transverse to the first conveyor direction (X),
a transfer device arranged on a height level between the first conveyor and the second conveyor and adapted to transfer eggs from the second conveyor to the first conveyor and comprising egg transfer retainers adapted to receive the eggs from above from the second conveyor, and adapted to release the eggs in the first egg retainers of the first conveyor,
wherein the transfer device includes a transfer conveyor comprising an endless element and at least one lane of said egg transfer retainers connected to the endless element and extending in the second conveyor direction (Y), and
wherein, in use, the second conveyor circulates said at least one lane of second egg retainers continuously, and the transfer conveyor circulates said at least one lane of egg transfer retainers discontinuously, in such a way that the lane of egg transfer retainers of the transfer device is moving synchronously with the lane of second egg retainers of the second conveyor when receiving the eggs in the second egg retainers of the second conveyor and such that the lane of egg transfer retainers of the transfer device is standing still when dropping eggs into the first egg retainers of the first conveyor.

* * * * *